(12) United States Patent
Sethuraman et al.

(10) Patent No.: US 6,643,387 B1
(45) Date of Patent: Nov. 4, 2003

(54) APPARATUS AND METHOD FOR CONTEXT-BASED INDEXING AND RETRIEVAL OF IMAGE SEQUENCES

(75) Inventors: Sriram Sethuraman, Hightstown, NJ (US); Edmond Chalom, Highland Park, NJ (US); Iraj Sodagar, North Brunswick, NJ (US)

(73) Assignee: Sarnoff Corporation, Princeton, NJ (US)

( * ) Notice: Subject to any disclaimer, the term of this patent is extended or adjusted under 35 U.S.C. 154(b) by 0 days.

(21) Appl. No.: 09/490,085

(22) Filed: Jan. 24, 2000

Related U.S. Application Data

(60) Provisional application No. 60/117,629, filed on Jan. 28, 1999.

(51) Int. Cl.[7] .................................................. G06K 9/62
(52) U.S. Cl. ....................... 382/107; 382/103; 382/173; 382/224; 348/699
(58) Field of Search .......................... 348/699; 382/173, 382/107, 103, 224, 236

(56) References Cited

U.S. PATENT DOCUMENTS

| | | | | |
|---|---|---|---|---|
| 5,557,684 A | * | 9/1996 | Wang et al. ................ | 382/107 |
| 5,734,737 A | * | 3/1998 | Chang et al. ............... | 382/107 |
| 5,787,205 A | * | 7/1998 | Hirabayashi ................ | 382/107 |
| 5,802,220 A | * | 9/1998 | Black et al. ................ | 382/100 |
| 5,909,251 A | * | 6/1999 | Guichard et al. ........ | 348/416.1 |
| 5,930,379 A | * | 7/1999 | Rehg et al. .................. | 345/473 |
| 6,097,832 A | * | 8/2000 | Guillotel et al. ............. | 382/107 |
| 6,154,578 A | * | 11/2000 | Park et al. ................... | 382/107 |
| 6,192,156 B1 | * | 2/2001 | Moorby ....................... | 382/236 |
| 6,236,682 B1 | * | 5/2001 | Ota et al. .................... | 348/699 |
| 6,263,089 B1 | * | 7/2001 | Otsuka et al. .............. | 382/107 |
| 6,400,830 B1 | * | 6/2002 | Christian et al. ........... | 348/155 |
| 6,400,831 B2 | * | 6/2002 | Lee et al. .................... | 382/103 |

FOREIGN PATENT DOCUMENTS

| | | | | |
|---|---|---|---|---|
| EP | 0 805 405 | 11/1997 | ........... | G06F/17/30 |

OTHER PUBLICATIONS

Bradshaw et al, The active recovery of 3D motion trajectories and their use in prediction, IEEE Transactions on Pattern Analysis and Machine Intelligence, Mar. 1997, vol 19, iss 3, p 219–234.*

Willersinn et al, Robust obstacle detection and tracking by motion analysis, IEEE Conference on Intelligent Transportation System, 1997. ITSC '97. Nov. 9–12, 1997, p 717–722.*

Lane et al, Motion estimation and tracking of multiple objects in sector scan sonar using optical flow, IEE Colloquium on Autonomous Underwater Vehicles and their Systems—Recent Developments and Future Prospects, 1996, p 6/1–611.*

(List continued on next page.)

*Primary Examiner*—Bhavesh M. Mehta
*Assistant Examiner*—Christopher Sukhaphadhana
(74) *Attorney, Agent, or Firm*—William J. Burke

(57) ABSTRACT

An apparatus and method for implementing object motion segmentation and object trajectory segmentation for an image sequence. Specifically, block-based motion vectors for a pair of adjacent frames are used to derive optical flow, e.g., affine, motion parameters. Such optical flow motion parameters are employed to determine key objects where their motion and trajectory within a sequence of frames are calculated and stored. Such object motion information is used to improve or offer image processing functions such as context-based indexing of the input image sequence by using motion-based information.

20 Claims, 6 Drawing Sheets

OTHER PUBLICATIONS

Ardizzone et al, Video indexing using optical flow field, Proceedings. International Conference on Image Processing, 1996. Sep. 16–19, 1996, vol 3, p 831–834.*

Lane et al, Robust tracking of multiple objects in sector-scan sonar image sequences using optical flow motion estimation, IEEE Journal of Oceanic Engineering, Jan. 1998, vol 23, iss 1, p 31–46.*

Giachetti et al, The use of optical flow for road navigation, IEEE Transactions on Robotics and Automation, Feb. 1998, vol 14, iss 1, p 43–48.*

Bors et al, Motion and segmentation prediction in image sequences based on moving object tracking, Proceedings. 1998 International Conference on Image Processing, 1998. ICIP 1998. Oct. 4–7, 1998, vol 3, p 663–667.*

Mae et al, Tracking moving object in 3–D space based on optical flow and edges, Proceedings. Fourteenth International Conference on Pattern Recognition, 1998. Aug. 16–20, 1998, vol 2, p 1439–1441.*

Gunsel, et al., "Content–based access to video objects: Temporal segmentation, visual summarization, and feature extraction," Signal Processing, 66 (1998), p. 261–280.

* cited by examiner

APPARATUS AND METHOD FOR CONTEXT-BASED INDEXING AND RETRIEVAL OF IMAGE SEQUENCES

This application claims the benefit of U.S. Provisional Application No. 60/117,629 filed on Jan. 28, 1999, which is herein incorporated by reference.

The invention relates to image processing for indexing and retrieval of image sequences, e.g., video. More particularly, the invention relates to an efficient framework for context-based indexing and retrieval of image sequences with emphasis on motion description.

BACKGROUND OF THE DISCLOSURE

With the explosion of available multimedia content, e.g., audiovisual content, the need for organization and management of this ever growing and complex information becomes important. Specifically, as libraries of multimedia content continue to grow, it becomes unwieldy in indexing this highly complex information to facilitate efficient retrieval at a later time.

By standardizing a minimum set of descriptors that describe multimedia content, content present in a wide variety of databases can be located, thereby making the search and retrieval more efficient and powerful. International standards such as Moving Picture Experts Group (MPEG) have embarked on standardizing such an interface that can be used by indexing engines, search engines, and filtering agents. This new member of the MPEG standards is named multimedia content description interface and has been code-named "MPEG-7".

For example, typical content description of a video sequence can be obtained by dividing the sequence into "shots". A "shot" can be defined as a sequence of frames in a video clip that depicts an event and is preceded and followed by an abrupt scene change or a special effect scene change such as a blend, dissolve, wipe or fade. Detection of shot boundaries enables event-wise random access into a video clip and thus constitutes the first step towards content search and selective browsing. Once a shot is detected, representative frames called "key frames" are extracted to capture the evolution of the event, e.g., key frames can be identified to represent an explosion scene, an action chase scene, a romantic scene and so on. This simplifies the complex problem of processing many video frames of an image sequence to just having to process only a few key frames. The existing body of knowledge in low-level abstraction of scene content such as color, shape, and texture from still images can then be applied to extract the meta-data for the key frames.

While offering a simple solution to extract meta-data, the above description has no motion-related information. Motion information can considerably expand the scope of queries that can be made about content (e.g., queries can have "verbs" in addition to "nouns"). Namely, it is advantageous to have additional conditions on known information based on color, shape, and texture descriptors, be correlated to motion information to convey a more intelligent description about the dynamics of the scene that can be used by a search engine. Instead of analyzing a scene from a single perspective and storing only the corresponding meta-data, it is advantageous to capture relative object motion information as a descriptor that will ultimately support fast analysis of scenes on the fly from different perspectives, thereby enabling the ability to support a wider range of unexpected queries. For example, this can be very important in application areas such as security and surveillance, where it is not always possible to anticipate the queries.

Therefore, there is a need in the art for an apparatus and method for extracting and describing motion information in an image sequence, thereby improving image processing functions such as content-based indexing and retrieval, and various encoding functions.

SUMMARY OF THE INVENTION

One embodiment of the present invention is an apparatus and method for implementing object motion segmentation and object trajectory segmentation for an image sequence, thereby improving or offering other image processing functions such as context-based indexing of the input image sequence by using motion-based information. More specifically, block-based motion vectors are used to derive optical flow motion parameters, e.g., affine motion parameters.

Specifically, optical flow (e.g., affine) object motion segmentation is initially performed for a pair of adjacent frames. The affine motion parameters are then used to determine or identify key objects within each frame. These key objects are then monitored over some intervals of the image sequence (also known as a "shot" having a number of frames of the input image sequence) and their motion information is extracted and tracked over those intervals.

Next, optical flow (e.g., affine) trajectory segmentation is performed on the image sequence. Specifically, the affine motion parameters generated for each identified key object for each adjacent pair of frames are processed over an interval of the image sequence to effect object trajectory segmentation. Namely, motion trajectory such as direction, velocity and acceleration can be deduced for each key object over some frame interval, thereby providing an another aspect of motion information that can be exploited by query.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
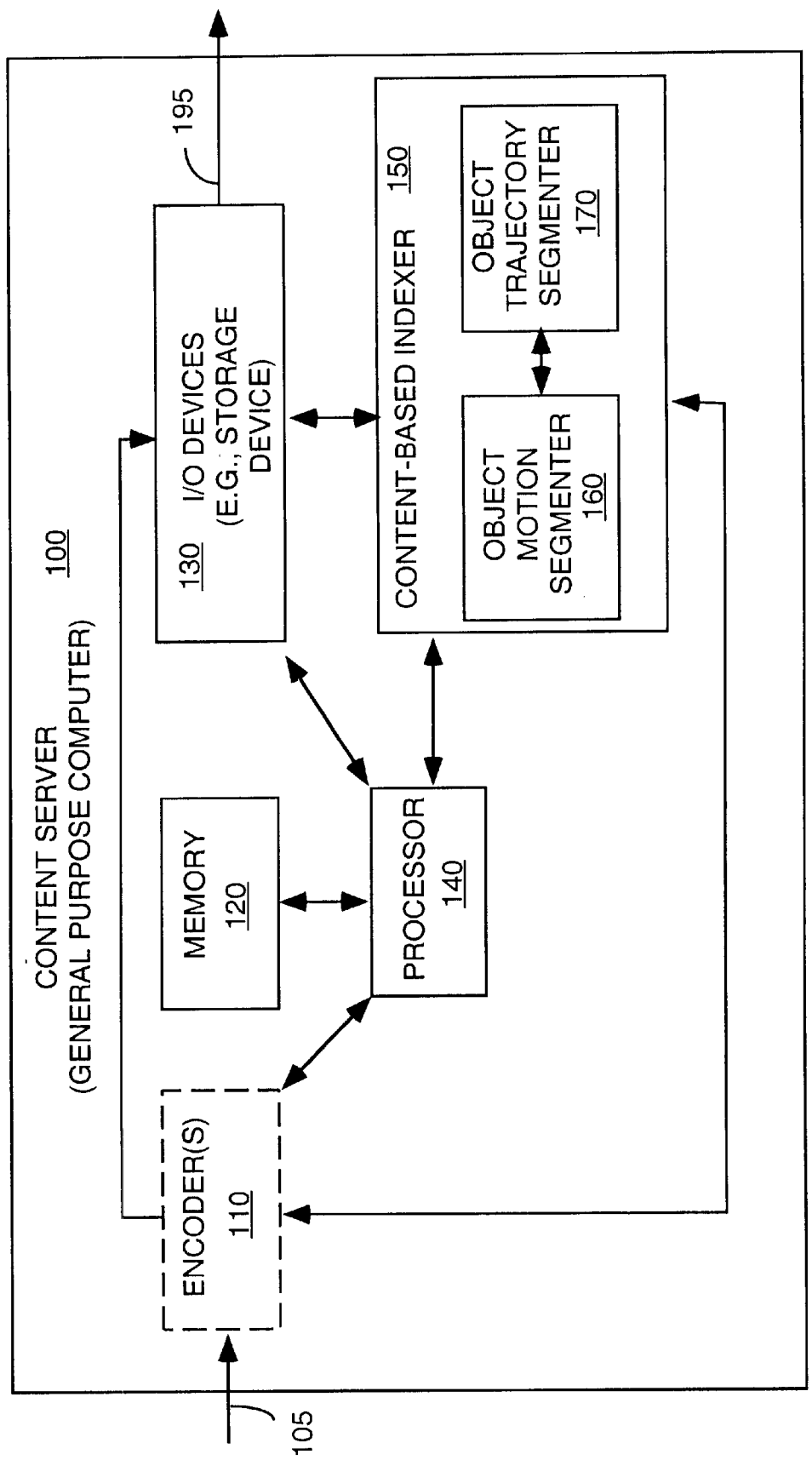
FIG. 1 depicts a block diagram of a content server of the present invention.

FIG. 1 depicts a block diagram of a content server 100 of the present invention. In one embodiment, the content server 100 is implemented using a general purpose computer. Thus, illustrative content server 100 comprises a processor (CPU)

140, a memory 120, e.g., random access memory (RAM), a context-based indexer 150, an optional encoder(s) 110 and various input/output devices 130, (e.g., a keyboard, a mouse, an audio recorder, a camera, a camcorder, a video monitor, any number of imaging devices or storage devices, including but not limited to, a tape drive, a floppy drive, a hard disk drive or a compact disk drive).

It should be understood that the encoder(s) 110 and the content-based indexer 150 can be implemented jointly or separately. Namely, the encoder(s) 110 and the content-based indexer 150 can be physical devices that are coupled to the CPU 140 through a communication channel. Alternatively, the encoder(s) 110 and the content-based indexer 150 can be represented by one or more software applications (or even a combination of software and hardware, e.g., using application specific integrated circuits (ASIC)), where the software is loaded from a storage medium, (e.g., a magnetic or optical drive or diskette) and operated by the CPU in the memory 120 of the computer. As such, the encoder(s) 110 and the content-based indexer 150 (including associated data structures) of the present invention can be stored on a computer readable medium, e.g., RAM memory, magnetic or optical drive or diskette and the like.

In operation, various multimedia information are received on path 105 and stored within a storage device 130 of the content server 100. The multimedia information may include, but is not limited to, various image sequences such as complete movies, movie clips or shots, advertising clips, music videos and the like. The image sequences may or may not include audio streams or data streams, e.g., closed captioning and the like.

Due to the explosion of available multimedia content and their large size, the input information on path 105 may undergo a compression process that is illustrated as one or more optional encoders 110. The encoders 110 may comprise video and audio encoders, e.g., MPEG-like encoders that are designed to reduce spatial and temporal redundancy. However, any number of compression schemes can be employed and the present invention is not so limited to any particular scheme. The encoders 110 are optional since the input information may have already undergone various compression processes outside of the content server, where the input stream is already in a compressed format. In such implementation, the encoders 110 can be omitted.

The content-based indexer 150 is employed to analyze the input information and to provide an efficient index to the large quantity and often complex multimedia content that are stored on the storage device(s) 130. The content-based indexer 150 of the present information is tasked to provide an indexing method and associated data structures that will allow an efficient method to categorize and then to allow retrieval of complex multimedia content quickly on path 195. More particularly, the present content-based indexer 150 employs motion information to allow more complex queries that employ "verbs" (e.g., relative motion information of an object), instead of just "nouns" (e.g., the color of an object).

For example, a query for an image sequence containing a blue background, e.g., a blue sky, may generate a large number of positive query hits, thereby reducing the effectiveness of the query function. In contrast, if the query can be modified for searching an image sequence containing a blue background with an object moving in the foreground at a high velocity to the left, then the response to the query may produce a highly focused set of positive responses, e.g., an image sequence having an aircraft moving rapidly across a blue sky background.

The content-based indexer 150 comprises an object motion segmenter 160 and an object trajectory segmenter 170. In brief, the object motion segmenter 160 is employed to broadly determine the relative motion of objects within each frame, wherein the object trajectory segmenter 170 is employed to broadly determine the trajectory of the objects within a number of frames within an image sequence.

Figure 2:
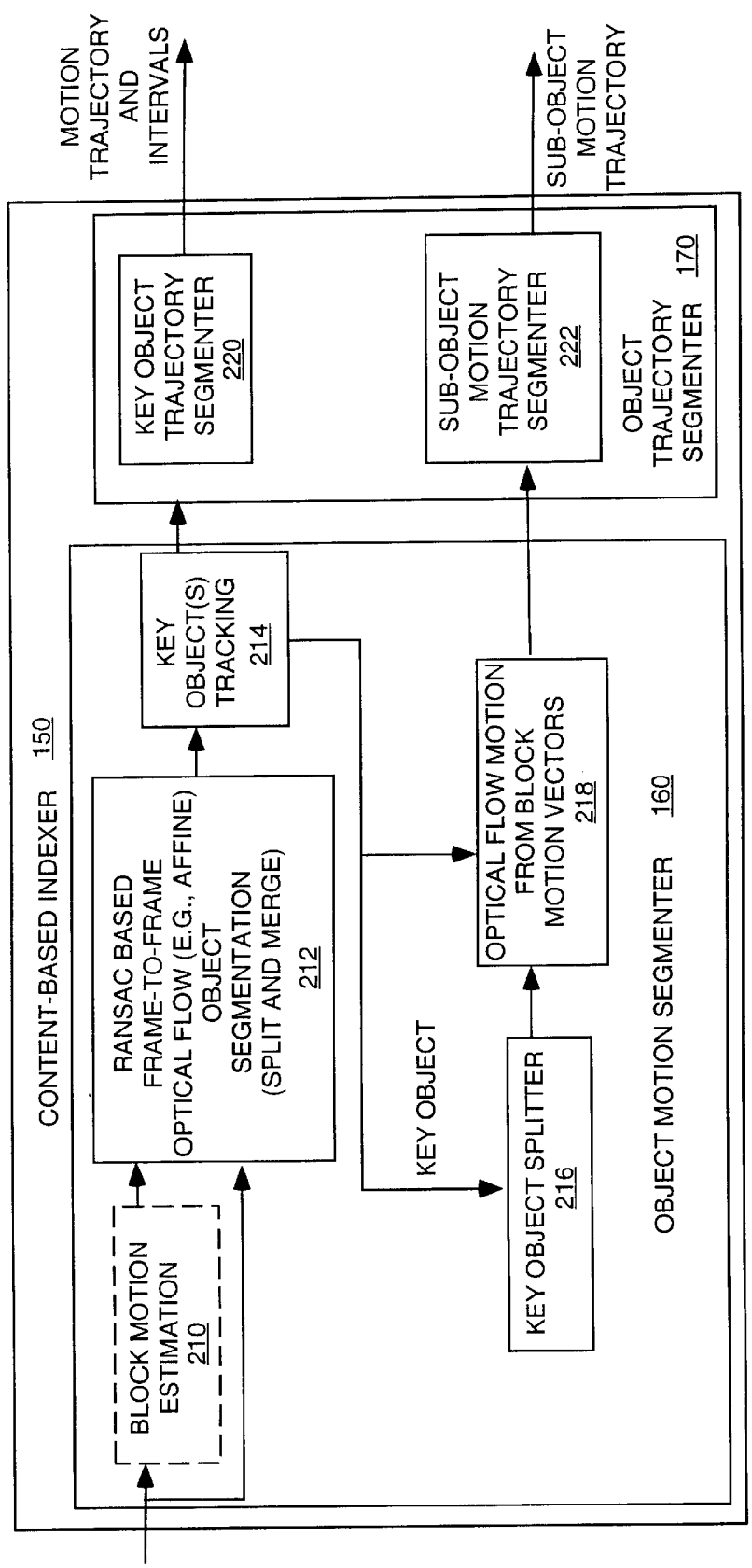
FIG. 2 depicts a block diagram of a context-based indexer of the present invention.

FIG. 2 depicts a block diagram of a context-based indexer 150 of the present invention comprising an object motion segmenter 160 and an object trajectory segmenter 170. The object motion segmenter 160 comprises a block-based motion estimator 210, an optical flow (e.g., affine) segmenter 212, a key object tracker 214, a key object splitter 216, and an optical flow (e.g., affine) segmenter 218. The object trajectory segmenter 170 comprises a key object trajectory segmenter 220 and a sub-object trajectory segmenter 222. The broad functions performed by these modules are briefly described with reference to FIG. 2. Detailed descriptions of these functions are provided below with reference to the flowcharts and other diagrams of FIGS. 3–6.

In operation, an image sequence is received into block-based motion estimator 210, where motion information, e.g., block-based motion vectors, are computed from the image sequence for each frame. However, if the content server 100 has an external encoder 110 or the input image sequence already contains motion information, i.e., where the motion vectors are encoded with the image sequence, then block-based motion estimator 210 can be omitted. Namely, the block based motion information can be extracted from the compressed bitstream itself or is provided by other modules of the content server 100, thereby relieving the object motion segmenter 160 from having to compute the motion vectors.

In turn, the optical flow (e.g., affine) segmenter 212 applies the motion vector information to generate "affine motion parameters". Although the present invention is described below using the affine motion model, it should be understood that other optical flow models can be employed as well. The affine motion model is disclosed by J. Nieweglowski et al. in "A Novel Video Coding Scheme Based On Temporal Prediction Using Digital Image Warping", IEEE Trans. Consumer Electronics, Vol. 39, 3, pp. 141–150, August, 1993, which is incorporated herein by reference. The affine motion model constructs a prediction image or frame from a previous image by applying a geometric transformation known as "image warping". The transform specifies a spatial relationship between each point in the previous and prediction images.

Generally, motion compensation using block matching provides a good overall performance for translational motion. However, the block-matching motion estimation is a poor performer when motion contains rotational or scaling components (e.g., zooming or rotating an image).

In contrast, the affine motion model (affine transformation) is defined by six parameters ($a_1$ to $a_6$) and is expressed as:

$$[x, y, 1] = [u, v, 1] \begin{bmatrix} a_1 & a_4 & 0 \\ a_2 & a_5 & 0 \\ a_3 & a_6 & 1 \end{bmatrix} \quad (1)$$

where (x, y) are pixel coordinates in the previous frame and (u, v) are the coordinates of a given pixel in the prediction frame. A detailed discussion on determining the six parameters is presented in the J. Nieweglowski et al. reference. The affine relationship is characterized by the six parameters. Thus, the affine motion model is generally more effective in predicting motions such as translation, scaling, and rotation which are often observed not only in natural sequences, but also in synthetic scenes using digital effects.

Namely, the affine segmenter 212 is tasked with the identification, segmentation, and generation of affine parameters for the "key objects" for each frame of the image sequence. Key objects can be viewed as objects that are sufficiently significant that tracking of their motion is important for the purpose of indexing or other image processing functions. Typically, key objects are identified in part based on their size, i.e., large objects are typically key objects, whereas small objects are not key objects. Thus, a moving vehicle is typically a key object whereas a small moving insect in the background is not a key object. Nevertheless, the requirements for qualifying key objects are application specific, and are defined by the user of the present invention. Once key objects are defined, the motions of these key objects are then tracked by key object tracker 214.

Optionally, if the motion information of components of each key object is also important for the purpose of indexing or other image processing functions, additional processing is performed by the key object splitter 216. Specifically, a key object can be segmented into sub-objects and the motion information for these sub-objects can be tracked individually. For example, a key object of a human being can be segmented into six sub-objects comprising a head, a body and four limbs. Thus, a query can now be crafted to search for "actions" that are relative to sub-objects within a key object, e.g., searching for an image sequence where a limb of a person is raised above the head of the person and so on.

Although some key objects can be readily split into well-defined sub-objects, other key objects may require further processing to identify the boundaries of sub-objects. Thus, the key objects information can be forwarded from the key object tracker 214 directly to an affine segmenter 218 for identification and segmentation of "sub-objects" for each key objects. Thus, affine segmenter 218 is also tasked with generating affine motion parameters for the sub-objects. It should be noted that although the content-based indexer illustrates two affine segmenters 212 and 218, it should be understood that a single affine segmenter can be implemented to perform both levels of affine processing (i.e., key object and sub-object processing).

In turn, the motion information from key object tracker 214 is forwarded to a key object trajectory segmenter 220. Although it is possible to maintain and track the motion information, e.g., the affine motion parameters, for each key object, it has been found that storing such motion information requires a substantial storage requirement. Thus, the motion information for each key object is forwarded to the key object trajectory segmenter 220, where motion trajectory information and intervals (frame intervals) are generated for each key object. Namely, the motion information is summarized into "key object trajectory information", e.g., direction, velocity, acceleration and the like within some defined intervals (over a number of frames). This allows the motion information to be captured and stored in a format that allows for efficient motion-based indexing (or other image processing) of multimedia content. Optionally, motion information for each sub-object is forwarded to the sub-object trajectory segmenter 222, where motion trajectory information and intervals (frame intervals) are generated for each sub-object.

Figure 3:
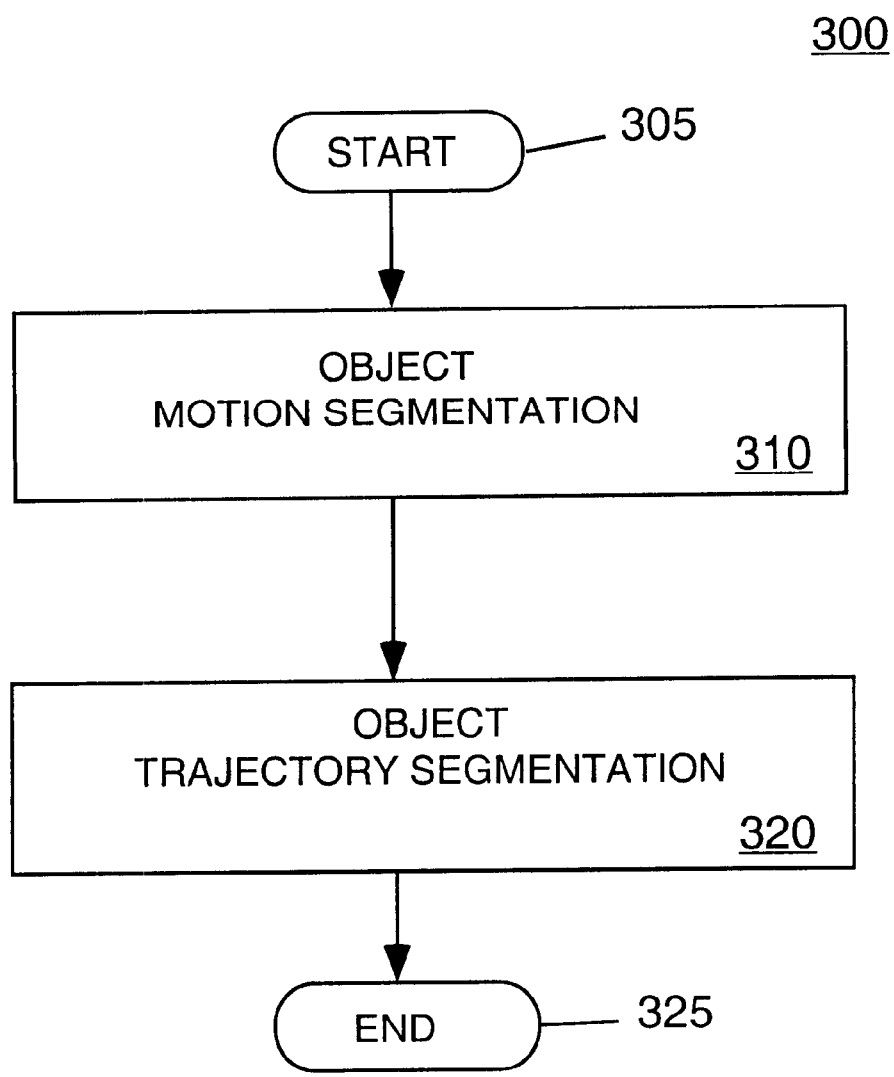
FIG. 3 depicts a flowchart of a method for implementing context-based indexing of an input image sequence by using motion-based information.

FIG. 3 depicts a flowchart of a method 300 for implementing affine segmentation, thereby improving or offering other image processing functions such as context-based indexing of an input image sequence by using motion-based information. More specifically, method 300 starts in step 305 and proceeds to step 310 where affine object motion segmentation is performed. Namely, key objects are identified within some intervals of the image sequence (also known as a "shot" having a number of frames of the input image sequence) and their motion information is extracted and tracked over those intervals. In step 310, affine motion parameters are generated for each identified key object.

In step 320, the affine motion parameters generated for each identified key object for each adjacent pair of frames are processed over an interval of the image sequence to effect object trajectory segmentation. Namely, motion trajectory such as direction, velocity and acceleration can be deduced for each key object over some frame interval, thereby providing another aspect of motion information that can be exploited by query. Method 300 then ends in, step 325.

Figure 4:
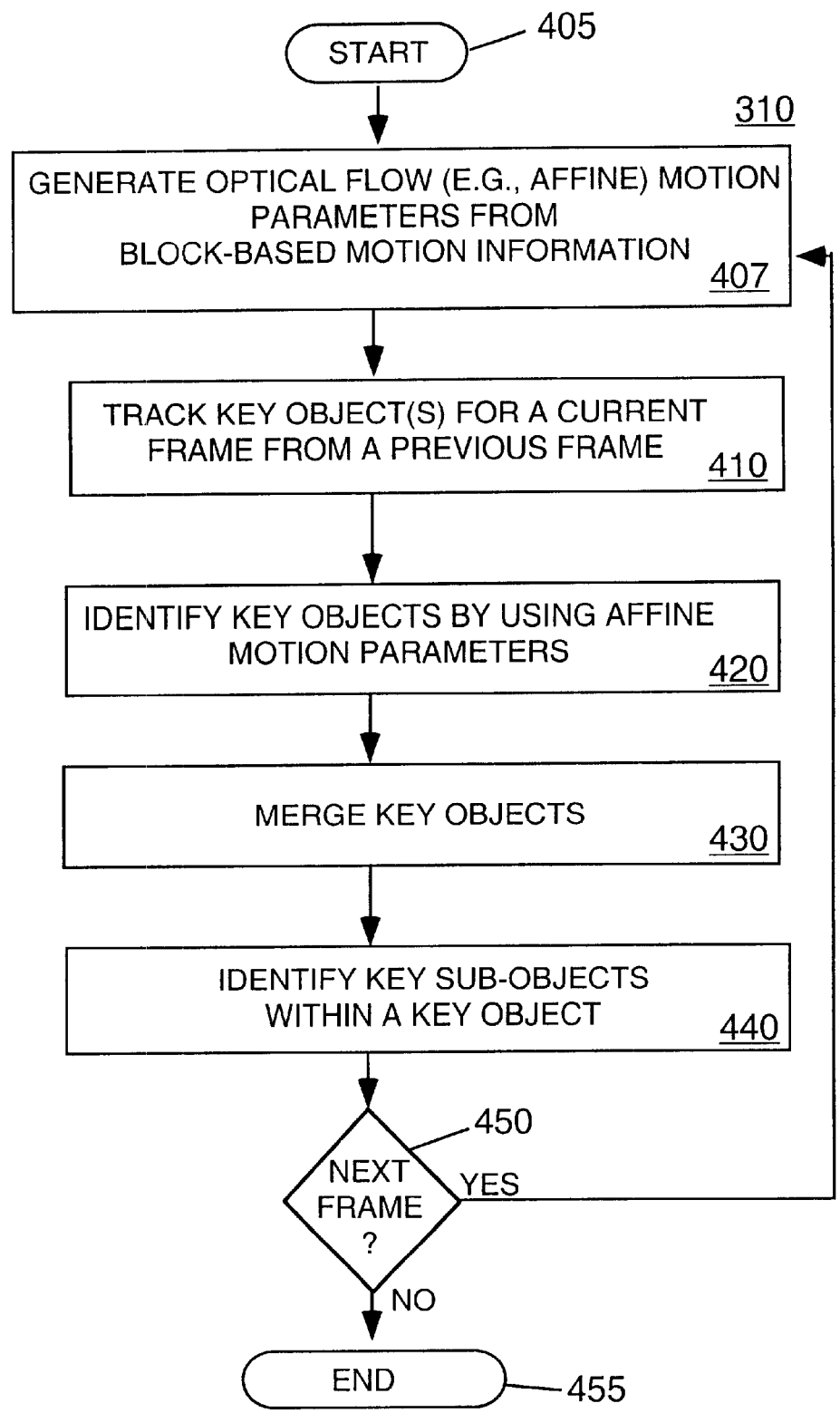
FIG. 4 depicts a flowchart of a method for implementing optical flow (e.g., affine) object motion segmentation; I

FIG. 4 depicts a flowchart of a method 310 for implementing affine object motion segmentation. Namely, method 310 is a more detailed description of step 310 of FIG. 3.

Method 310 starts in step 405 and proceeds to step 407, where method 310 generates affine motion parameters from block-based motion information. Namely, a random number of blocks are selected where their block-based motion vectors are employed to derive affine motion parameters as discussed below.

In step 410, method 310 attempts to track one or more identified key objects from a previous frame, i.e., obtain the label of a key object from a previous frame. Namely, once key objects have been identified for a pair of adjacent frames as discussed in step 420 below, it may not be necessary to again apply the same detection step for the next frame in the image sequence. Namely, for a new frame, block based motion vectors can be employed to rapidly look backward to see whether the blocks point to a previously identified key object. If so, such blocks will retain the same labeling as in the previous frame. For example, if four (4) key objects have been determined for a pair of adjacent frames and if the next frames contains five (5) connected regions, then motion vectors are employed to determine whether four out of the five connected regions in the present frame correlate to the four identified key objects. If so, then only the remaining single connected region is tested in accordance with step 420 to determine whether it is a key object. This method of tracking significantly reduces the computational overhead, i.e., key objects are tracked in the image sequence until the objects can no longer be tracked, e.g., the object has become too small or occluded. However, if no key objects can be identified, step 410 is skipped, as in the case where method 310 processes a new shot.

In step 420, method 310 identifies the key objects within a pair of adjacent frames of the input image sequence. In one embodiment, the key objects are identified by determining whether a block is within the affine object flow.

In step 430, method 310 may optionally merge identified key objects. For example, the identified key objects may be too small to be significant for image processing purposes, i.e., indexing in a particular application, e.g., a single bird can be merged with other birds within the frame to form a key object of a flock of birds.

In step 440, method 310 may optionally identify sub-objects within key objects. In contrast to step 430 above, the identified key object may have significant motion information associated with its components (sub-objects) for indexing purposes in a particular application. For example, an identified key object comprising of a human being may comprise sub-objects, i.e., the person's limb, where the relative motion information of the sub-objects is important for indexing the shot.

In step 450, method 310 queries if there are additional frames associated with the present "shot". If the query is negatively answered, then method 310 ends to step 455. If the query is positively answered, then method 310 proceeds to step 407, where the affine motion parameters are generated for the next pair of adjacent frames. Namely, affine segmentation has to be performed between successive pairs of frames. The reason is that the affine motion parameters are needed at each instant to model the trajectory and to also handle new objects/occlusions. Method 310 then ends in step 455 when all frames have been processed.

Figure 5:
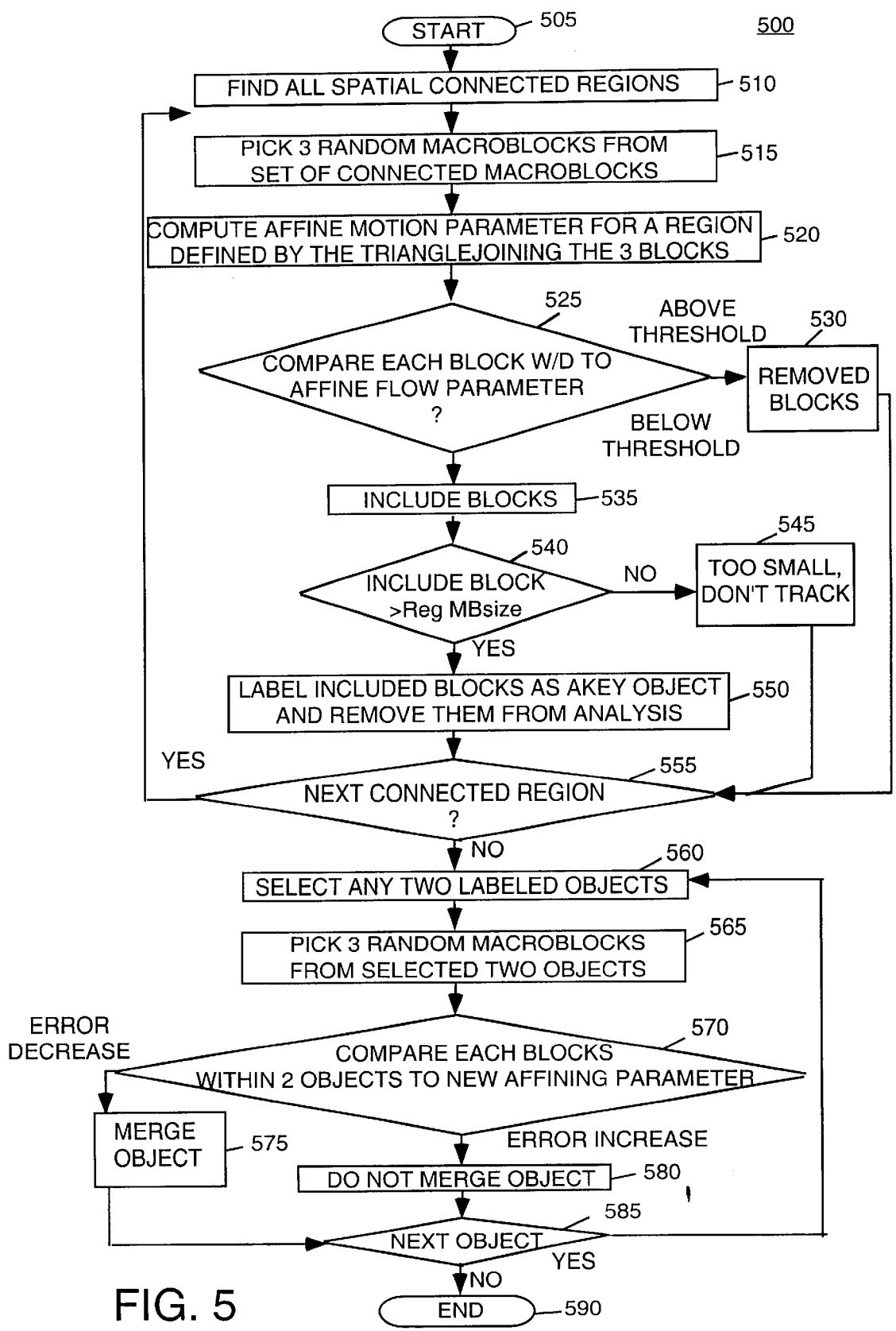
FIG. 5 depicts a flowchart of a more detailed method for implementing optical flow (e.g., affine) object motion segmentation.

FIG. 5 depicts a flowchart of a method 500 for implementing affine object motion segmentation. More specifically, method 500 is a more detailed description of the steps 410 and 420 of FIG. 4.

Method 500 starts in step 505 and proceeds to step 510 where key objects are to be determined. It should be noted that various methods exist for determining the motion information for regions within a frame, e.g., optical flow techniques for computing motion for every pixel, where these techniques are usually computationally complex. Furthermore, if the sequence has already been encoded (e.g., as an MPEG-2 bitstream), optical flow computations would require complete decoding of the bitstream. Thus, in the present invention, affine motion parameters are obtained from block motion vectors, which can either be computed (using simple block matching with Sum of Absolute Differences (on a hardware or software platform) or can be obtained from the motion vectors of P-frames in the compressed domain.

In one embodiment, the affine motion parameters are obtained by using then Random Sampling Consensus (RANSAC) method that offers a rapid approach to identify potential key object candidates compared to a very complex exhaustive search. The method computes regions with affine flow (in other words, an affine motion segmentation) between every two consecutive frames in an image sequence or portion thereof, i.e., a shot. Namely, in step 510, method 500 first attempts to locate all the "connected regions" with a frame. Any number of methods can be employed to determine whether a block of pixels, e.g., a macroblock, is part of a "connected region". One example of a disclosure that teaches connectivity of blocks is disclosed in U.S. patent application entitled "Method And Apparatus For Generic Shape Coding" with attorney docket "SAR 13076" filed May 17, 1999, which is commonly owned by the Assignee and is herein incorporated by reference. For example, macroblocks within a shape boundary can be perceived as being a connected region.

Figure 6:
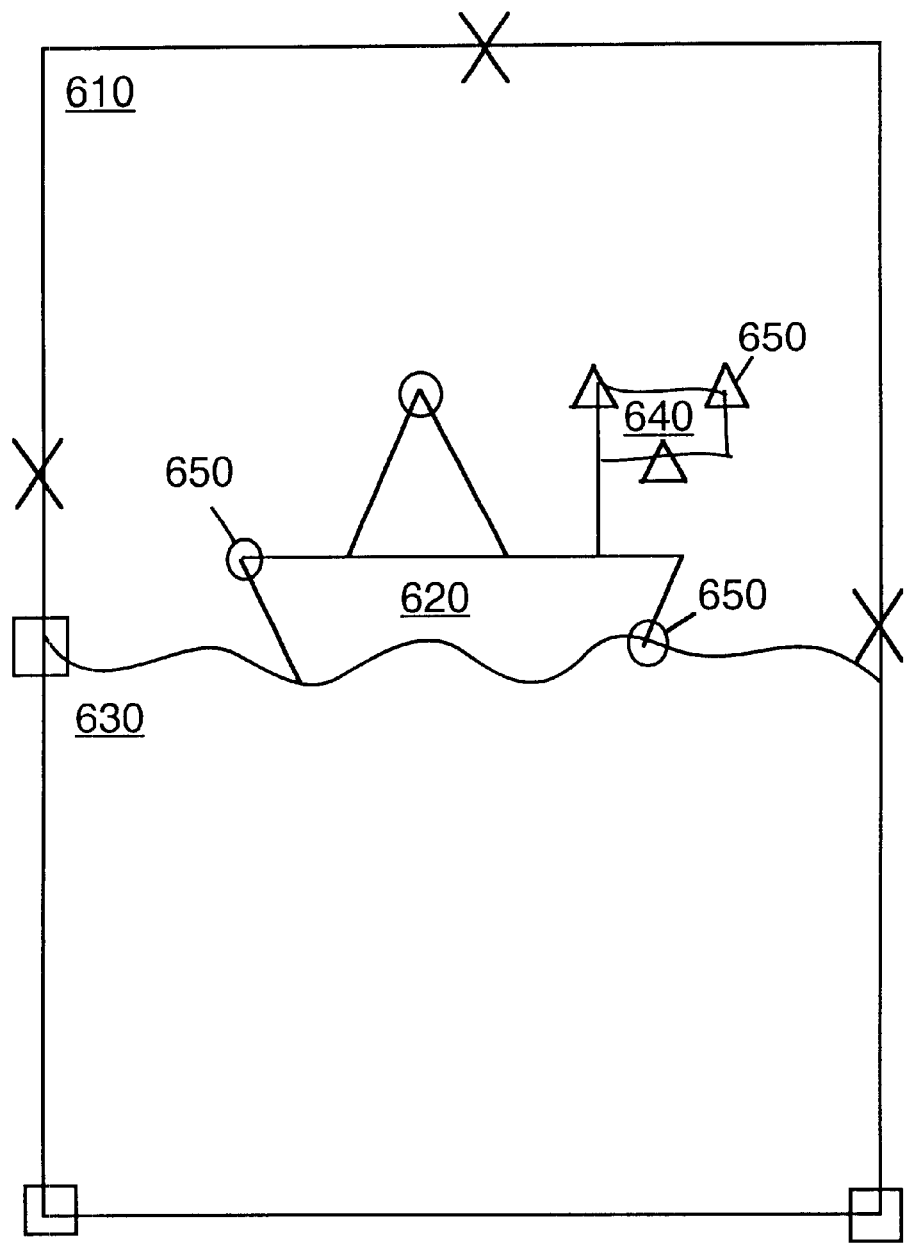
FIG. 6 illustrates a frame having a plurality of connected regions.

In step 515, three random macroblocks are selected from this set of connected macroblocks, i.e., from within each connected region. FIG. 6 illustrates a frame having a plurality of connected regions 610–640. For example, connected regions 610 and 630 are the background and foreground respectively, whereas connected regions 620 and 640 are a sailboat and a flag, respectively. To illustrate, in step 515, three blocks illustrated by Xs are randomly selected for connected region 610, while three blocks illustrated by O's are randomly selected for connected region 620 and so on.

In step 520, method 500 computes affine motion parameters for the three randomly selected blocks. Specifically, the block based-motion vectors for these three selected blocks are sufficient to deduce the six affine motion parameters. Since three blocks are the bare minimum number of blocks necessary to generate the six affine motion parameters, it should be understood that motion vectors from more than three blocks within the connected region can be used as well. It should be noted that the present assumption is that the affine motion parameters are computed from the three macroblocks. Given the motion at the vertices of the triangle formed by the three blocks, the six affine motion parameters can be computed. Namely, the affine motion parameters provide the displacement at each point within the triangular patch formed by the three macroblocks.

In step 525, method 500 queries on a block-by-block basis of each block's motion within the entire frame whether a block's motion is within the affine flow defined by the affine motion parameters. In other words, apply the affine motion parameters to each macroblock in the frame and compute the distance between this position and the position given by the block's motion vector. If the distance is less than a threshold, "eThresh", then that macroblock is added to the list of blocks as being part of the connected region, i.e., the macroblock is labeled as being part of a key object. Thus, if the query is affirmatively answered, then the block is deemed to fall within an affine flow object in step 535. If the query is negatively answered, then the block is deemed to fall outside of an affine flow object in step 530. Namely, a key object is potentially identified or labeled by all the macroblocks that exceed the threshold.

In step 540, method 500 queries whether the included blocks are greater than a threshold of a number of blocks, "Reg MBsize" (e.g., 10 macroblocks). This threshold, "Reg MBsize", is application specific, e.g., dependent on the size and resolution of the input frame. If the query is affirmatively answered, then method 500 proceeds to step 550 where the selected or included blocks are deemed to be a potential "key object". If the query is negatively answered, then the selected or included blocks are deemed to be too small to track in step 545. Namely, if the total number of macroblocks with the same affine parameters is greater than a certain preset number, RegMBsize, then all the macroblocks falling within these parameters are given a common label, e.g., key object 1 and so on. All macroblocks with the same label constitute a new motion region, i.e., grouped as a key object. This step ensures that the three vertices do belong to a physical object and that object is not too small.

In step 555, method 500 queries whether there are additional connected regions. If the query is affirmatively answered, then method 500 returns to step 515 where three blocks are randomly selected in the next connected region. Steps 515–550 are then repeated for the next connected region. If the query is negatively answered, then method 500 starts the merge operation in step 560. It should be noted that blocks that have been previously labeled as being part of a key object are no longer evaluated in subsequent execution of steps 515–550. Namely, once a block within a frame is deemed to be part of a key object, this block is removed from consideration for subsequent detection of other key objects, i.e., decreasing number of blocks will be available for subsequent evaluation. Thus, it is preferred that the present key object segmentation process starts by selecting three blocks from the largest connected region, if possible.

In step 560, a merge operation follows where two physically connected key objects are selected. The purpose is to apply a test to determine if the motion information for the two selected regions are so close such that it is appropriate to consider them as a unitary key object instead of being two separate key objects.

In step 565, a new set of three blocks is randomly selected from an area defined by the combination of the two selected connected regions. For example, if connected regions 620 and 640 are being evaluated for a merge operation, then the three randomly selected blocks can be illustrated by reference numerals 650. Similar to step 520, a new set of affine motion parameters is generated from the motion vectors of the newly selected set of three blocks.

Similar to step 525, in step 570, method 500 queries on a block-by-block basis of each block's motion within the two key objects whether the block motion is within the affine flow defined by the newly generated affine motion parameters. In other words, the two connected key objects are compared with a common affine fit and to determine if a certain percentage of the macroblocks in both objects have an error distance less than eThresh. If the percentage is exceeded, then the two key objects are merged into a single connected key object. Namely, if the query is affirmatively answered (error decrease), then most blocks are deemed to fall within the newly formed affine flow object. Thus, the two regions are merged in step 575.

If the query is negatively answered (error increase), then most blocks are deemed to fall outside of the newly formed affine flow object. Thus, the two regions are not merged in step 580.

In step 585, method 500 queries whether there are additional key objects to be considered for merging. If the query is affirmatively answered, then method 500 returns to step 560 where two connected key objects are selected, i.e., steps 560–580 are then repeated until all objects have been considered for merging. If the query is negatively answered, then method 500 ends in step 590.

Additionally, it should be noted that relevant steps of FIG. 5 can be adapted to derive affine motion parameters for sub-objects of the identified key objects as discussed above with reference to FIG. 2. Specifically, a key object can be split into sub-objects, where method 500 is then applied to generate affine flow sub-objects. Namely, method 500 can be applied at the sub-object level for each of the identified key objects, i.e., replacing the term "object" with "sub-object" in FIG. 5.

Hierarchically within each key object, region splitting can be accomplished based on local motion in sub-intervals. For example, after segmenting a person as a whole as one key object, parts of the person that move over time such as face, limbs, and the like can be split into a connected set of sub-regions or sub-objects. The affine modeling method from block motion vectors, tracking, and motion trajectory modeling procedure can be applied to these sub-regions as well. Thus, each sub-region's motion is also piecewise-modeled over time intervals.

Given that two or more sub-regions belong to the same key object, their trajectories can be used to identify the action performed by that key object. Specifically, if further context on a key-object and its sub-regions is provided through manual means or through analysis of their shape, color, texture, and the like, then conditioned upon this knowledge, a contextual relationship between the sub-regions can be developed. Thus, by analyzing the sub-region motion trajectories, specific actions performed by the key object can be deduced.

For example, if it turns out that the key object is a person (e.g., through skin-tone detection and shape) and the sub-regions correspond to the limbs of this person, then from the trajectory of the different joints in the limbs, specific motions such as run, walk, lift, etc. (see below for a detailed list of actions) can be identified.

The correspondence between objects in the different frames is performed by tracking the significantly sized objects in the first frame until it no longer can be tracked, e.g., until the object has moved out of the scene or has been permanently occluded. Significantly sized objects in future frames that have no correspondence in prior frames are given new object labels within the clip and tracked from that frame on into the future. Since the block matching has already been performed, tracking can be achieved in a simple fashion by assigning a region in the current frame to that region in the tracked set of regions in the previous frame to which the largest fraction of macroblock motion vectors point to.

This above method is primarily employed to extract large moving objects within a "shot". In other words, the thresholds for this phase are chosen so as to capture the general trend in the motion of an object as a whole and not the minor variations within it. Since all objects are tracked, the initial macroblock membership and the affine motion parameters between frames are enough to obtain a coarse synthesis of the motion trajectory of each key object. Smooth segments of the motion trajectory can be modeled using polynomials in time. A method for modeling motion trajectory is performed by the object trajectory segmenter 170, which is briefly described below. In fact, a detailed description of the novel object trajectory segmenter 170 is described in U.S. patent application Ser. No. 09/489,627 entitled "Apparatus And Method For Describing The Motion Parameters Of An Object In An Image Sequence", which is herein incorporated by reference and is filed simultaneous herewith.

The object trajectory segmenter 170 will serve to reduce the need to encode the affine parameters at each frame of the image sequence. The trajectory can be represented using the coefficients of the polynomial fit in a piecewise manner. This coarse object trajectory is quite useful in answering queries about over-all object motions, e.g., fast moving, going up, down, left, right, diagonally, rotating, going in Z direction, coming out in Z-direction, etc.

Typically, the largest connected key object will be the background. Thus, the proposed motion analysis can automatically provide global motion parameters such as pan, zoom, tilt which can be due to either camera motion or due to platform motion. In addition, key object(s) being approximately tracked by the camera can be identified by the fact that this object will have the least change in position over an interval.

In one embodiment, the key objects can be modeled using ellipses. By estimating the overlap of the ellipses from the trajectory information, occlusions and key-object interactions can be identified. Occlusions can be distinguished from interaction by the fact that motion continues smoothly past the point of occlusion where as object interactions usually result in a change in motion trend. Object interactions can be scenarios such as meeting, collision, and the like, which can themselves be important meta-data (as temporal points of interest). The occlusions can be used in the selection of frames that will be used for spatial analysis (to extract color, shape, texture meta-data). Typically, frames with minimal overlap between key objects (excluding background) is preferred for such purposes so that proper spatial meta-data on each key object can be extracted.

It should be noted that the tracking step need not be performed for video that is already segmented, such as an MPEG-4 video-object. However, the procedure for macroblock motion vectors to an affine model translation and the method for estimating a piece-wise motion trajectory for the key object still apply.

When the inferences are drawn or how much details the inferences will be depend on the application domain. For example, to facilitate fast search and retrieval, a search engine might compute "actions" and classify the sequences according to them. To enable search across a wide variety of applications and for inter-operability, it is enough if the motion trajectory descriptors along with a few starting positions and size descriptors are standardized for each key-object/region/sub-region. These descriptors offer a compact, yet powerful representation for performing search/filtering based on activities. These descriptors also nicely complement other spatial descriptors, and leverage knowledge from those descriptors to improve the retrieval accuracy. The framework naturally lends itself to a hierarchical description scheme. It should be noted that although the present object motion segmentation has been described using the affine model, the present novel framework can be easily extended to other motion models as well. For example, the present object motion segmentation can be adapted by using "translational motion" model, "isotropic motion" model (uniform scale, rotation in x, y+translation), and "perspective motion" model.

In one embodiment, the object trajectory segmenter 170 employs a split-and-merge method for a quadratic (with respect to time) motion model of the spatial position of a region's geometric mean that can be generalized to arbitrary motion trajectory models as follows: Given the frame-to-frame motion information for a region, develop an expression to predict the position of all the points on the object over time within an interval, and choose an error metric that measures the sum of deviations in distance at each point on the region at each time instant based on this prediction compared to the original positions. Then this interval can be split if the error metric exceeds a certain experimental threshold T1 and at the instant at which the deviation is a maximum. The merge procedure would merge two adjacent intervals if the joint predicted expression over both intervals generates an error that is smaller than T1 or another experimental threshold.

An example for affine motion model would be as follows:

(a) Derive affine motion parameters between adjacent frames to describe the position of each point on a region at each time instant.

(b) Derive affine motion parameters between a subsampled set of frames in the chosen interval depending on the order of the fit, e.g. quadratic expressions require at least 2 data sets, etc.

(c) Decompose affine motion parameters into its components, namely, scale, rotation, shear, and translation. Assume different temporal models for each component depending on its nature. For example, the translation can be modeled using a quadratic in time. The scale can be modeled to vary linearly over time. The rotation can be modeled using a constant angular velocity assumption.

(d) Using the subsampled affine motions, obtain the coefficients for the chosen prediction model.

(e) Apply the prediction model at each frame and compute the sum of the deviations at all points in each frame. Sum the frame errors, normalize and compare them to a preset threshold T1. If the error>T1, divide the interval into two at the location of maximum frame error.

(f) Repeat steps (b)–(e) for each interval recursively, until the error is below T1 in all intervals.

(g) Now merge intervals if a joint prediction model for two adjacent intervals results in a normalized error below threshold T2.

(h) Repeat (g) for all intervals recursively until any further merging increases the normalized error in the merged interval above T2.

Data Structures

For the purpose of this disclosure, it should be understood that a video sequence can be separated into "shots". Each shot is represented using a linked list (i.e., a new data structure) of shot description schemes valid over different time intervals within the shot. The shot data structures (DS) can have sub-description schemes or descriptors based on color, shape, texture and motion. A motion data structure along with a motion descriptor is disclosed below. The data structure has a hierarchical structure with global_motion, object_motion, and region_motion descriptions. A linked list can be used to point to the next time interval.

Motion Trajectory Description Scheme

DS Description Scheme

A linked list data structure is assumed (for e.g., key object description schemes within a shot are accessed by starting from the initial pointer and accessing the pointer to the next link, etc.) The level of the description in the hierarchy is shown using indentation. (start time, time_interval) pair is used throughout to represent the time support. The time can be either media time (time reference on the content) or the actual time.

```
shot_DS{
    start_time, time_interval      (Time and duration in media/actual
                                    time)
    Number of key objects (First level key objects in a shot)
    Global_motion_DS               (Background key object)
    Pointer to Key_object_DS array (Pointer to first entry in a linked
    key list of object DSs)
    Key_object_interaction_times DS
        (DS containing the instants within the shot when key objects
        interacted)
}
        Global_motion_DS{
            start_time, time_interval
            Pointer to first link of
            Global_motion_subinterval_trajectory_DS
            }
            Sub_interval_global_motion_trajectory_DS{
                start_time, time_interval
                Model_class_id for motion_trajectory_descriptor
                    (Trajectory description may use a predefined
                    set of models (e.g., quadratic in position of object
                    centroid) - the model_clas_id is the index
                    of the chosen model in the set))
                Global motion_trajectory_descriptor
                    (descriptor parameters for global motion
                    trajectory based on the model class_id)
                Pointer to next_interval_
                Sub_interval_global_motion_trajectory_DS
        Key_object_interaction_times_DS{
            Pointer to first like of key_object_interaction
            time descriptor
Key_object_DS{
    Key_object_ID              (Label or index of key object)
    start_time, time_interval  (start time and time interval in
    terms
                                of frames, i.e., at what frame is
                                object detected and for how long)
    Key_object_first_frame_geometry_DS
                                (Used to define the initial
                                coarse shape)
    Key_object_motion_trajectory_DS
    Number of sub_regions      (Number of sub-objects within
                                the object)
    Pointer to sub_region_DS array
    Key_object_spatial_DS      (Spatial description of key
                                objects (such as color, shape,
                                texture, etc.))
```

-continued

```
}
    Key_object_motion_trajectory_DS{
        Pointer to first link of
    key_object_sub_interval_motion_trajectory_DS
        (Linked_list of
        key_object_sub_interval_motion_trajectory_DS)
    }
            Key_object_sub_interval_motion_trajectory_DS{
                start_time, time_interval
                Model_class_id for
                motion_trajectory_descriptor
                Key_object motion_trajectory_descriptor
                Pointer to sub_region_DS array
                Pointer to next_interval
                    key_object_sub_inter-
                    val_motion_trajectory_DS
            }
    Sub_Region_DS{
        Sub_Region_ID
        start_time, time_interval
        Sub_region_motion_trajectory_DS
        Sub_region_spatial_DS
    }
            Sub_region_motion_trajectory_DS{
                Pointer to first link of
                sub_region_sub_inter-
                val_motion_trajectory_DS
                (Linked_list of
            sub_region_sub_interval_motion_trajectory_DS)
            }
                Sub_region_sub_interval_motion_tra-
                jectory_DS{
                    start_time, time_interval
                    Model_class_id for
                motion_trajectory_descriptor
                    Sub_region motion_trajectory_descriptor
                    Pointer to next_interval
                    sub_region_sub_interval_motion_tra-
                    jectory_DS
                }
Descriptors:
    motion_trajectory_descriptor{
        float ax, ay, vx, vy, px, py; (for quadratic model)
    }
    Model_class_ID descriptor for motion trajectory {
        Model class ID of the motion trajectory model used
    }
    Key_object_interaction_time_descriptor {
        time reference (Time with respect to start of shot)
        number of key_objects (involved in the interaction)
        key_object_id of the objects interacting at that
        time (indices of key objects)
```

The motion trajectory descriptor based on a quadratic model of position of the geometric mean over time of an object is provided only as an illustration.

In light of the present motion segmentation and trajectory segmentation, a plurality of novel queries can be implemented as follows:

Possible Queries Based on Motion Alone:
  a) Global motion:
    i) A shot where the camera is panning, tilting, rolling, zooming or tracking (background motion).
    ii) Extent of global motion (indicative of extent of action in the shot)
  b) Local object/region motion:
    i) Number of significant objects in a shot
    ii) Extent of motion (fast/slow)
    iii) Object(s) being tracked by the camera
    iv) Locations of sudden discontinuities
    v) Violent actions
    vi) Identifying similar traces across sequences and over time
    vii) In-contact vs. out-of-contact motion Possible Queries Based on Motion Conditioned on other Descriptors:
  Human actions: walk, run, jump, bend, sit, stand, fall, turn, dance, gesticulate, hand-shake, throw, catch, lift, hit, skate, kneel, pedal, punch, cut, fence, nod, hold, write, type
  Vehicular actions: fly, move, stop, sail, cruise, turn, dive, rotate
  Other living object actions: actions of animals (birds, etc.) run, fly, swim, dive
  Random actions: leaves, river
  Object interactions: human actions on other animate/inanimate objects, collisions Similarity Metrics for Finding Matches for Each Query Above:

The generalized solution is to build probability density functions (pdf) for each action in the motion model parameter space using training data. Then a given sample motion model parameter set can be classified into one of the actions using M-ary hypothesis testing with maximum likelihood (or log likelihood) as the metric. The model parameters have to be suitably normalized for the creation of the pdf and for subsequent classification, so as to be independent of the size and position of the object and the frame rate of the analysis.

Although the present object motion segmentation and object motion trajectory segmentation are described above for improving the indexing and retrieval of image sequences, it should be understood that the present invention can be employed to improve or provide other image processing functions. For example, the present invention can be employed in encoding functions, e.g., identified key objects can be considered region-of-specific importance, or global motion parameters can be derived.

Furthermore, although the present invention is described above in terms of objects, it should be understood that an object is broadly defined to be a region of interest having varying sizes depending on the application. Similarly, although the present invention is described above in terms of blocks such as macroblocks, it should be understood that a block is broadly defined to be a block of varying sizes depending on the specific application.

Although various embodiments which incorporate the teachings of the present invention have been shown and described in detail herein, those skilled in the art can readily devise many other varied embodiments that still incorporate these teachings.

What is claimed is:

1. A method for performing object motion segmentation for an image sequence having a plurality of frames, said method comprising the steps of:
  a) determining at least one connected region within one of said frames of said image sequence;
  b) applying block-based motion vectors corresponding to blocks within said at least one connected region to generate optical flow motion parameters; and
  c) using said generated optical flow motion parameters for identifying a key object.

2. The method of claim 1, wherein said applying step b) applies block-based motion vectors of at least three blocks of said at least one connected region to generate said optical flow motion parameters.

3. The method of claim 1, further comprising the step of:
  d) determining if an identified key object found in step c) is of sufficient size.

4. The method of claim 1, further comprising the step of:
  d) determining if any two identified key objects found in step c) are to be merged into a single key object.

5. The method of claim 4, wherein said determining step d) comprises the step of:
   d1) applying block-based motion vectors from at least three blocks from said any two identified key objects to generate a new set of optical flow motion parameters.

6. The method of claim 1, further comprising the steps of:
   d) labeling an identified key object found in step c); and
   e) tracking said labeled key object in a current frame by using motion vector information from said current frame to correlate a region in said current frame with a labeled key object of a previous frame.

7. The method of claim 1, further comprising the steps of:
   d) indexing the image sequence in accordance with said optical flow motion parameters of any identified key objects from step c).

8. The method of claim 7, wherein said indexing step d) indexes the image sequence in accordance with said optical flow motion parameters of any identified key objects in conjunction with a spatial information associated with said any identified key objects.

9. The method of claim 1, further comprising the steps of:
   d) splitting said identified key object into a plurality of sub-objects; and
   e) applying block-based motion vectors from at least three blocks from each of said sub-objects to generate a new set of optical flow motion parameters for each of said sub-objects.

10. A method for performing motion segmentation and trajectory segmentation for an image sequence having a plurality of frames, said method comprising the steps of:
    a) applying optical flow object motion segmentation to obtain motion information for identifying at least one key object for a frame of the image sequence; and
    b) applying optical flow object trajectory segmentation to obtain trajectory information for said at least one key object for a frame interval greater than two frames of the image sequence.

11. The method of claim 10, wherein said applying step a) comprises the steps of:
    a1) determining at least one connected region within one of said frame of said image sequence;
    a2) applying block-based motion vectors to generate optical flow motion parameters; and
    a3) using said generated optical flow motion parameters for searching one or more key objects.

12. The method of claim 1, wherein said optical flow motion parameters are affine motion parameters.

13. An apparatus for performing object motion segmentation for an image sequence having a plurality of frames, said apparatus comprising:
    means for determining at least one connected region within one of said frame of said image sequence; and
    an optical flow object segmenter for applying block-based motion vectors corresponding to blocks within said at least one connected region to generate optical flow motion parameters and for using said generated optical flow motion parameters for searching one or more key objects.

14. The apparatus of claim 13, wherein said optical flow object segmenter applies block-based motion vectors of at least three blocks of said at least one connected region to generate said optical flow motion parameters.

15. The apparatus of claim 13, wherein said optical flow object segmenter determines if an identified key object is of sufficient size.

16. The apparatus of claim 13, wherein said optical flow object segmenter determines if any two identified key objects are to be merged into a single key object by applying block-based motion vectors from at least three blocks from said any two identified key objects to generate said optical flow motion parameters.

17. An apparatus for performing motion segmentation and trajectory segmentation for an image sequence having a plurality of frames, said apparatus comprising:
    an optical flow object motion segmenter for obtaining motion information for at least one key object for a frame of the image sequence; and
    an optical flow object trajectory segmenter for obtaining trajectory information for said at least one key object for a frame interval greater than two frames of the image sequence.

18. The apparatus of claim 17, wherein said optical flow object motion segmenter comprises:
    means for determining at least one connected region within one of said frame of said image sequence; and
    a segmenter for applying block-based motion vectors to generate optical flow motion parameters and for using said generated optical flow motion parameters for searching one or more key objects.

19. A computer-readable medium having stored thereon a plurality of instructions, the plurality of instructions including instructions which, when executed by a processor, cause the processor to perform the steps comprising of:
    a) determining at least one connected region within one of said frame of said image sequence;
    b) applying block-based motion vectors corresponding to blocks within said at least one connected region to generate optical flow motion parameters; and
    c) using said generated optical flow motion parameters for identifying a key object.

20. A computer-readable medium having stored thereon a plurality of instructions, the plurality of instructions including instructions which, when executed by a processor, cause the processor to perform the steps comprising of:
    a) applying optical flow object motion segmentation to obtain motion information for identifying at least one key object for a frame of the image sequence; and
    b) applying optical flow object trajectory segmentation to obtain trajectory information for said at least one key object for a frame interval greater than two frames of the image sequence.

* * * * *